United States Patent [19]

Byerley et al.

[11] Patent Number: 4,519,880
[45] Date of Patent: May 28, 1985

[54] PROCESSES FOR THE RECOVERY OF CYANIDE FROM AQUEOUS THIOCYANATE SOLUTIONS AND DETOXICATION OF AQUEOUS THIOCYANATE SOLUTIONS

[76] Inventors: John J. Byerley, 154 Chelford Crescent, Waterloo, Ontario, Canada, N2J 3T5; Kurt Enns, 345 Dale Crescent, Waterloo, Ontario, Canada, N2J 3Y6

[21] Appl. No.: 540,520

[22] Filed: Oct. 7, 1983

Related U.S. Application Data

[62] Division of Ser. No. 416,239, Sep. 9, 1982.

[51] Int. Cl.$^3$ .......................... C25B 1/00; C25B 1/14; C25B 1/22
[52] U.S. Cl. ..................................... 204/91; 204/101; 204/102; 204/103; 204/128
[58] Field of Search ................. 204/91, 101, 102, 128, 204/103; 210/748

[56] References Cited

U.S. PATENT DOCUMENTS 2,260,881 10/1941 Beier .................................... 204/103
2,737,298 3/1956 Hendel ................................ 204/101

FOREIGN PATENT DOCUMENTS 17447 of 1888 United Kingdom ................ 204/103

Primary Examiner—Howard S. Williams
Attorney, Agent, or Firm—Daryl W. Schnurr

[57] ABSTRACT

A process for the recovery of cyanide from thiocyanate. An aqueous solution containing thiocyanate is introduced into an electrochemical reactor. The reactor is activated for an appropriate time period while the pH of the solution is maintained in the range of 1 to 4. The cyanide formed can be recovered, in various ways including recovery as hydrocyanic acid. Alternatively, an aqueous solution containing thiocyanate is introduced into a suitable electrochemical reactor. The reactor is activated for an appropriate time period while the pH of the solution is maintained in the range of 10 to 12 to produce relatively harmless products, for example, cyanate, ammonia, carbon dioxide and nitrogen.

4 Claims, No Drawings

PROCESSES FOR THE RECOVERY OF CYANIDE FROM AQUEOUS THIOCYANATE SOLUTIONS AND DETOXICATION OF AQUEOUS THIOCYANATE SOLUTIONS

This is a divisional application of application Ser. No. 416,239, filed Sept. 9, 1982.

BACKGROUND OF THE INVENTION

1. Field of the Invention

This invention relates to an electrochemical process for oxidizing thiocyanate ($SCN^-$). In particular, this invention relates to a process for recovering cyanide ($CN^-$) from aqueous solutions containing thiocyanate by controlled partial electrooxidation of thiocyanate. This invention further relates to a process for electrochemically oxidizing thiocyanate in an aqueous solution to relatively harmless reaction products.

2. Description of the Prior Art

Aqueous solutions containing thiocyanate arise from many industrial processes, the principal sources being hydrometallurgical processing of gold and silver ores and concentrates and certain unit operations related to base metal processing. Very large volumes of effluent containing somewhat lower levels of thiocyanate eminate from coking operations either from the quenching waters or gas cleaning installations. The refining of petroleum produces dilute thiocyanate solutions and thiocyanate is a common component of many inorganic waste streams generated by the chemical industry. Waste effluents containing thiocyanate are environmentally objectionable because in the natural environment thiocyanate is oxidized by various pathways yielding highly toxic cyanide compounds.

It is helpful to consider an example of a typical thiocyanate containing waste liquor that could be treated by the present process. In gold recovery by cyanidation of sulfidic concentrates obtained by froth flotation of copper ore tailings, the waste liquor effluent may contain 1000–1200 milligrams of $CN^-$ per liter and 1200–1400 milligrams per liter of $SCN^-$. The presence of thiocyanate in the effluent represents a significant loss of reagent cyanide.

The formation of thiocyanate is a result of the release of sulfide ($S^{2-}$) present in compounds of copper, iron, nickel and other metals during the cyanidation leaching of the tailings. Sulfide undergoes chemical oxidation in the oxygen rich leach liquor to form a series of oxysulfur species including thiosulfates and thionates. It is believed that thiocyanate is formed by reaction of cyanide with thionates. A reaction suggested for the formation of thiocyanate by the action of trithionate ion ($S_3O_6^{2-}$) with cyanide is shown in equation (1).

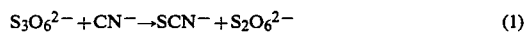

$$S_3O_6^{2-} + CN^- \rightarrow SCN^- + S_2O_6^{2-} \quad (1)$$

In addition to the irreversible consumption of reagent cyanide, there is evidence to suggest that the presence of thiocyanate in gold cyanidation solution inhibits the oxidation of gold and therefore retards its solubilization. This effect could possibly be due to the formation of unstable gold sulfides on the metallic gold surface thereby reducing the rate of mass transport of the reactants, cyanide and dissolved oxygen resulting in a reduction of the gold leaching rate. A common practice in gold mills which serves to maintain the thiocyanate at an appropriate and acceptably low level is to discharge up to 20% of the thiocyanate fouled leach liquor from the cyanidation circuit per day. The remaining liquor is then regenerated by addition of reagent cyanide. Let us assume for the purposes of this example that the volume of fouled leach solution discharged per day is 250 metric tons. This represents approximately 350 kilograms of free and complexed cyanide per day.

Another source of waste effluent occurs in the processing of a concentrate fraction obtained from complex zinc-copper-lead sulfide ores. In this example, it is necessary to use a cyanide concentration of twenty times the conventional level in order to effect dissolution of contained silver values. Under these conditions, it is found that a significant fraction of the cyanide is converted to thiocyanate. The barren discharge solution can be acidified allowing the expurgation of cyanide as hydrocyanic acid (HCN). The cyanide depleted residual acidic solution may contain up to 1000 milligrams/liter of thiocyanate. The silver recovery process may produce up to 1800 kilograms of thiocyanate per day.

The two examples given above demonstrate the large quantity of thiocyanate bearing waste liquor produced by cyanidation of sulfide ores and concentrates. The conventional method of processing this type of effluent (aside from natural oxidation in holding ponds which is reported to be relatively slow when compared to the natural oxidation of cyanide) is by chemical oxidation using aqueous hypochlorite or using chlorine gas and aqueous caustic—the latter is usually termed alkaline chlorination. The stoichiometry for the alkaline chlorination of thiocyanate to cyanate ($CNO^-$) and sulfate ($SO_4^{2-}$) is often represented by equation (2).

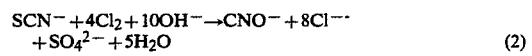

$$SCN^- + 4Cl_2 + 10OH^- \rightarrow CNO^- + 8Cl^- + SO_4^{2-} + 5H_2O \quad (2)$$

The cyanate species ($CNO^{31}$) may undergo further oxidation with additional chlorine and base but will also dissociate via a hydrolysis reaction producing in receiving waters, ammonia and carbonate. Using the stoichiometry of equation (2), an estimate of the chemical requirements can be made for treating by conventional means the thiocyanate contained in the effluent of example 1. If a typical 10% reagent excess is assumed, approximately 0.85–1.0 metric tons per day of chlorine is required together with 2.3–2.7 metric tons of sodium hydroxide per day (a portion of the base requirement may already be available in the effluent). The treated waste would contain approximately 2.4–2.8 metric tons per day of sodium chloride which often is unacceptable in receiving waters. For the purposes of comparison, the chemical requirements for oxidation of 300 kilograms per day of cyanide would be 0.9 metric tons per day of chlorine and 1.0 metric ton per day of sodium hydroxide. The stoichiometry of the alkaline chlorination of cyanide is given by equation (3).

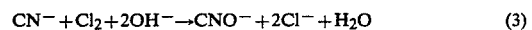

$$CN^- + Cl_2 + 2OH^- \rightarrow CNO^- + 2Cl^- + H_2O \quad (3)$$

These estimates of reagent requirements indicate that the oxidation of thiocyanate by chemical means is an inherently expensive and hazardous proposition and is generally regarded as being much more expensive than alkaline chlorination of the cyanide which often accompanies the thiocyanate oxidation.

It is an object of the present invention to provide a process whereby thiocyanate can be electrochemically oxidized more economically than by conventional means and to recover, for credit and reuse, cyanide which forms as an intermediate product of the electrooxidation. The process of the present invention can be carried out on a batch or continuous basis with a variety of effluent compositions. With many thiocyanate effluents no chemical pretreatment such as pH adjustments or adjustment of the buffer index or capacity of the effluent before electrochemical treatment is required. Also, when thiocyanate or cyanide is treated in the conventional manner by chemical oxidation, the waste contains a large amount of sodium chloride and may very well contain undesirable levels of free chlorine or sodium hydroxide from chemical overdosage. In addition, when treated in the conventional manner, the volume of the effluent may be considerably increased by the large volume of reagents added.

SUMMARY OF THE INVENTION

In accordance with the present invention, an aqueous solution containing thiocyanate is introduced into a suitable electrochemical reactor. The reactor is activated for an appropriate time period under controlled conditions and the cyanide so formed is recovered. Preferably, the pH of the aqueous thiocyanate solution during the electrochemical reaction is maintained in the range of 1 to 4.

There is further provided a process wherein an aqueous solution containing thiocyanate is introduced into a suitable electrochemical reactor. The reactor is activated for an appropriate time period and the pH of the aqueous solution is maintained in a range of 10 to 12 during the reaction. When the thiocyanate in the aqueous solution has been oxidized to relatively harmless products, the aqueous solution is removed from the reactor.

Whether the process in accordance with the present invention is utilized to recover cyanide or to convert the thiocyanate solution into relatively harmless reaction products, as described above, depends on the level of thiocyanate present in the effluent. A waste liquor with a high concentration of thiocyanate would normally be treated under conditions to allow maximum recovery of the intermediate cyanide formed during the electrooxidation process. However, if the waste liquor contains only low levels of thiocyanate, two options for processing would be possible. The dilute thiocyanate containing liquor may be completely electrooxidized producing an environmentally acceptable waste or the dilute thiocyanate containing liquor may be concentrated by a convenient physical or chemical method. The concentrated thiocyanate solution then may be treated by the method of the present invention which allows for cyanide recovery.

DESCRIPTION OF THE PREFERRED EMBODIMENT

In discussing the invention in greater detail, it is helpful to refer to the possible electrochemical reactions that occur. In the electrochemical treatment of thiocyanate, electrooxidation of thiocyanate occurs at anodic surfaces, and at cathodic surfaces electroreduction of hydrogen ion occurs to produce hydrogen gas. If the thiocyanate solution contains other electrooxidizable species such as cyanide, thiosulfate, thionates, etc., the reactions at the anodic surfaces will consist of a number of parallel electrooxidation reactions. Further, the parallel electrooxidation of water (or hydroxyl ions) will also occur at anodic surfaces. Similarly, if the thiocyanate solution contains platable metals such as copper, zinc, nickel etc., the reactions at the cathodic surfaces will consist of number of parallel electroreduction reactions comprising the simultaneous production of hydrogen and the cathodic deposition of metals. For the purpose of explaining the electrooxidation of thiocyanate it is useful to consider that the solution is essentially a pure thiocyanate solution.

Since the cyanide moiety in thiocyanate can be anodically converted to a series of products such as cyanide ion, cyanate ion, nitrogen gas and carbon dioxide or carbonate and bicarbonate ion, it is helpful to consider the electrooxidation reactions in sequence. Although the stoichiometries of the various thiocyanate reactions have not been unequivocally established, considerable analysis of anodic products of electrooxidation of thiocyanate indicates that under a range of electrolysis conditions the fate of thiocyanate may be represented by the following equations:

Electrooxidation of $SCN^-$ to $CN^-$ and $SO_4^{2-}$ $$SCN^- + 4H_2O \rightarrow CN^- + SO_4^{2-} + 8H^+ + 6e \qquad (4)$$

Electrooxidation of $SCN^-$ through to $CNO^-$ and $SO_4^{2-}$ $$SCN^- + 5H_2O \rightarrow CNO^- + SO_4^{2-} + 10H^+ + 8e \qquad (5)$$

Electrooxidation of $SCN^-$ through to $CO_2, N_2$ and $SO_4^{2-}$ $$SCN^{31} + 6H_2O \rightarrow 0.5N_2 + CO_2 + 12H^+ + SO_4^{2-} + 11e \qquad (6)$$

The above reactions represent stoichiometries and the form of the species in solution will, of course, depend on the pH. For example, cyanide in acidic solution will be present almost entirely in the neutral HCN form while in highly basic solution it will be present almost entirely as $CN^-$ ion. Similarly, the weak base sulfate ion will partially protonate in acidic solutions, and except in low pH solutions, carbon dioxide will be present as a mixture of bicarbonate and carbonate ions.

The stoichiometry of the anodic production of oxygen gas by the electrooxidation of water (or hydroxyl ion) is represented by equation (7) or equation (8).

$$2H_2O \rightarrow O_{2(g)} + 4H^+ + 4e \qquad (7)$$

$$4OH^- \rightarrow O_{2(g)} + 2H_2O + 4e \qquad (8)$$

In the absence of electroreducible species such as platable metals, the predominant reaction at the cathode is the production of hydrogen gas by the electroreduction of hydrogen (hydronium) ion or, equivalently, from the stoichiometric viewpoint, the electroreduction of water. The reaction may be written as follows:

$$2H_2O + 2e \rightarrow H_{2(g)} + 2OH^- \qquad (9)$$

From the standpoint of recovering cyanide from thiocyanate, the relevant electrode reactions are (4) and (8). From the standpoint of converting thiocyanate to relatively nontoxic cyanate and to nontoxic nitrogen gas and carbon dioxide, the relevant electrode reactions are respectively (5) and (9) and (6) and (9). The anodic formation of oxygen gas operates in parallel with all thiocyanate anodic reactions. At high thiocyanate concentrations, the current efficiency for oxygen production is relatively low. At low thiocyanate concentrations (and cyanide), oxygen production becomes the predominant anodic reaction.

The overall electrochemical cell reaction leading to the production of cyanide from thiocyanate is obtained by combining equations (4) and (9) to yield reaction equation (10).

$$SCN^- + 4H_2O \rightarrow CN^- + H_2SO_4 + 3H_2 \qquad (10)$$

When considering the overall reaction (10) and assuming a current efficiency of 100% (that is no other anodic and cathodic reactions of significance are occurring), there is a net acid production of 0.33 moles of $H^+$ per Faraday of charge through the cell. Therefore, as the electrochemical processing of thiocyanate solution proceeds the solution tends to become more and more acidic. Reaction (10) stoichiometry has been verified by analysis for thiocyanate, cyanide and acid during the course of electrolysis.

The production of acid is beneficial from the standpoint of the specific cyanide yield since (except where the thiocyanate solution has a high buffering capacity) it has the effect of preserving the cyanide produced from undergoing further rapid electrooxidation to cyanate or through to nitrogen gas and carbon dioxide. Initially, the conversion of thiocyanate at the anode can be represented by the reaction (4). When the thiocyanate solution does not have a high buffering capacity in the acidic direction, the large amount of acid produced (8 moles of $H^+$ per mol of cyanide produced) will tend to cause a substantial decrease in the pH of the anolyte solution adjacent the anode surface. Similarly, the hydroxyl ion produced by the cathodic reaction will increase the pH in the catholyte adjacent the cathode surfaces although this effect will be resisted if the thiocyanade solution has substantial buffering capacity in the basic direction. This suggests that an acidic anode boundary layer and a basic cathode boundary layer may exist.

It is the establishment of an acidic anode boundary layer which is believed to be the main reason why the cyanide product is protected from rapid electrooxidation at the anode. It has been established that the free anionic $CN^-$ is much more easily electrooxidized than the neutral protonated HCN form of cyanide. As thiocyanate is electrooxidized at the anode to produce cyanide ion, the cyanide ion is immediately protonated by the anodically produced acid. Consequently, the acidic anode boundary layer functions to preserve cyanide from rapid electrooxidation at the anode by converting the cyanide ion into the much more difficult electrooxidize neutral protonated form. This explanation is considered in a quantitative way in the discussion below on data Tables 1–4.

The protonated form of thiocyanate is similarly made less easily electrooxidized than the free anionic $SCN^-$ form of thiocyanate. However, in this case the acidic anode boundary layer appears to have little effect on the current efficiency of thiocyanate coversion to cyanide. An explanation is found in the fact that HSCN is an extremely strong acid compared to HCN. The pKa of HSCN is less than 1.0 (pKa of HCN is 9.32) which means that even if the pH of the acidic anode boundary layer dropped as low as pH 1.0, more than 50% of the thiocyanate in the acidic boundary layer would still exist in the $SCN^-$ form, which is much less difficult to electrooxidize.

The explanation given above relating to the boundary layers appears to have some validity as demonstrated by the data in the following tables, each representing a separate run. There may be different, but equally plausible, theories to explain why the process of the present invention occurs. The explanation given above is not intended to be conclusive.

TABLE 1

| Run #1; Bulk pH = 11.1; 0.5 M in carbonate buffer | | |
|---|---|---|
| t (min) | $SCN^-$ (mg/l) | $CN^-$ (mg/l) |
| 0 | 2920 | 0 |
| 10 | 2160 | 195 |
| 12 | 1910 | 199 |
| 50 | 1226 | 73 |
| 100 | 285 | 9 |
| 200 | 8 | ~0 |

TABLE 2

| Run #2; Bulk pH = 9.5; 0.5 M carbonate buffer | | |
|---|---|---|
| t (min) | $SCN^-$ (mg/l) | $CN^-$ (mg/l) |
| 0 | 2860 | 0 |
| 10 | 2090 | 286 |
| 50 | 1180 | 482 |
| 65 | 852 | 503 |
| 100 | 303 | 420 |
| 200 | 11 | 12 |

TABLE 3

| Run #3; Bulk pH = 9.6; 0.05 M carbonate buffer | | |
|---|---|---|
| t (min) | $SCN^-$ (mg/l) | $CN^-$ (mg/l) |
| 0 | 2868 | 0 |
| 10 | 2195 | 311 |
| 50 | 1330 | 621 |
| 90 | 548 | 814 |
| 200 | 13 | 410 |

TABLE 4

| Run #4; Bulk pH = 4.2; no buffer salts added | | |
|---|---|---|
| t (min) | $SCN^-$ (mg/l) | $CN^-$ (mg/l) |
| 0 | 2930 | 0 |
| 10 | 2285 | 322 |
| 50 | 1402 | 640 |
| 100 | 482 | 952 |
| 120 | 310 | 1085 |
| 200 | 37 | 950 |
| 250 | ~9 | 892 |

The above data were obtained by processing 300 liter batches of thiocyanate solution in an industrial size electrochemical reactor described below and referred to as Reactor 2. The solutions were made up using tap water and technical grade salts. Electrochemical processing was carried out on a batch recirculation basis. The temperature was maintained in the range 24°–29° C. The operating current and the recirculation flow rate were the same in all runs.

The buffer capacities for the bulk solutions were respectively 0.25, 0.14, 0.014 and 0.002 mol $H^+$ per liter per unit decrease in pH for runs 1 to 4. Comparing the rate of thiocyanate electrooxidation, it is apparent that there is no significant difference in the rates in all four runs.

Considering the extreme runs 1 and 4, the higher buffer index in run 1 would effectively prevent significant acidification of the anode boundary layer. However, in run 4 the absence of buffer would result in strong acidification of the anode boundary layer—estimated drop in pH is about 3 pH units to pH 1.2 the fact that thiocyanate electrooxidation rate is essentially the same in anode boundary layers at pH 11 and 1.2 suggests the explanation given above for the lack of variation of thiocyanate electrooxidation rate with pH might be valid.

Comparing the accumulation rates of cyanide in the four runs, it is seen that very little cyanide accumulates in run 1 and close to the theoretical amount calculated from equation (10) accumulates in run 4—at least in the first part of the run. A possible explanation is as follows. In run 1, the acidification of the boundary layer will be resisted by the strong buffering capacity of the solution and consequently the boundary layer will not drop much below pH 11. At pH 11 the fraction of cyanide product in the more easily electrooxidizable form, cyanide ion, will approach 100%. Therefore conditions are ideal in run 1 for electrooxidation of cyanide. Thus as cyanide is produced from thiocyanate, it is electrooxidized in a parallel anodic reaction, hence the low rate of cyanide accumulation and the rapid disappearance of cyanide as the run proceeds. In run 3, the fraction of cyanide in the cyanide ion form in the bulk solution at pH 9.6, is equivalent to about 60%. However, the moderate buffering capacity of the solution will not greatly resist the acidification of the anode boundary layer. It is estimated for this case that the pH of the boundary layer can drop about 1 pH unit to about pH 8.6. At pH 8.6 approximately 13% of the cyanide product will exist in the more easily electrooxidizable cyanide ion form. Thus the rate and level of cyanide accumulation in run 3 should be more than in run 1, which is apparent from the data. This explanation is validated by the data of run 2. In run 2 the buffer capacity is 10 times higher than in run 3 and very little anode boundary layer acidification would be expected. If this obtains, then the rate and level of cyanide accumulation, according to our proposed theory, should be greater in run 3 than in run 2 which the data confirms. In run 4 as noted above, the anode boundary layer acidification down to an estinated pH 1.2 could occur because the solution is acidic initially and the buffering capacity of the solution is essentially negligible. In this run it would be expected that essentially all the cyanide found will be in the less easily electrooxidizable HCN form in the bulk solution and in the acidic boundary layer. Therefore, the rate and level of cyanide accumulation should be highest in this run, which is confirmed by the data.

The process of the present invention has an additional advantage in that the sulphur present in thiocyanate appears in the stoichiometry of the half-cell reaction (4) and (6) in the form of sulphate ($SO_4^{2-}$). Chemical analyses on process solutions after both partial and complete oxidation has determined that virtually all sulphur is present as sulfate, which is an environmentally acceptable form. This is important where it is desired to use the process of the present invention to treat industrial effluents that initially contain intermediate oxy-sulfur species as well as thiocyanate.

Various electrochemical reactors will be suitable for use with the process according to the present invention. For example, the electrochemical reactor or electric cell described in U.S. Pat. No. 3,900,377 is a suitable reactor that can be used to carry out the process in accordance with the present invention. Various other suitable reactors will be readily apparent to those skilled in the art. However, while it will be possible to use various electrochemical reactors including a conventional electrochemical reactor, the efficiency of the process will vary greatly with the type of reactor used.

While the reactor described in U.S. Pat. No. 3,900,377 is suitable to carry out the process according to the present invention, when the process is to be carried out on a large scale, this reactor is presently too expensive and too fragile to be economically feasible. Since the process of the present invention will often be utilized in a large scale operation, the reactor is preferably one that has durable components and is capable of being fully erected at the site.

A second suitable reactor that can be used to carry out the process in accordance with the present invention is a discrete, fixed layer, particulate, bipolar reactor (henceforth referred to as reactor No. 2). Reactor No. 2 has at least two layers of electrically conductive particles, each layer being discrete in that it is separated from adjacent layers by an electrically insulating spacer or screen wedged between adjacent layers of particles. Electrically insulating spacers are also located immediately beneath the lower most layer and immediately above the upper most layer of particles. The various layers are maintained in a fixed relationship by said spacers. Except for that taken by the spacers themselves, there is no gap, distance or space between adjacent layers of particles. Of course, the reactor vessel must contain means for supporting the various layers within it. Preferably, the base of the reactor vessel is strong enough to support the various layers.

In reactor No. 2, the reactor vessel can be constructed of virtually any suitable material and any reasonable shape but is preferably circular in cross section. For example, the reactor vessel can be made of steel with the inside wall being rubber-lined so that it is electrically insulated. Also, the reactor wall could be made of concrete. The reactor vessel could also be constructed in modular form so that additional sections could be added as required. The two primary electrodes can be fabricated from various materials for example, graphite plates, stainless steel, lead or even mild steel.

The conducting or semi-conducting material for use as layers of particles in reactor No. 2 can be various materials, for example, graphite, metallurgical coke or anthracite. The particles can be specifically arranged in a fixed relationship to form a layer, for, where crushed particles are used, sufficient particles can simply be poured onto an insulating spacer to form one layer. One type of particle that works well consists of 2.5×2.5 cm graphite cylinders that have been tumbled wet in a rotating drum. The rotating drum produced graphite nodules approaching spherical shape as the edges are rounded by the tumbling action. These nodules are placed on what remains of the flat portion of the cylinder (i.e. in an upright position) in a fixed relationship forming one layer of particles. Each layer is topped by a poly-vinyl chloride coated fiberglass mesh and then the next layer of tumbled cylinders is placed immediately on top of that fiberglass mesh. Ultimately, a series of fixed conducting layers is created, each separated by a non-conducting membrane, all interposed between a primary anode and cathode. Particle sizes are screened so that no particles are smaller than 0.25 cm.

With reactor No. 2, in addition to fiberglass mesh, various other materials can be used as the insulating spacer. For example, crushed stone, coarse granular plastic nodules, ceramic burl saddles or similarly shaped ceramic or plastic shapes or glass fabric with poly-vinyl chloride coating.

There are various ways that the cyanide formed as an intermediate product in accordance with the process of the present invention, can be recovered for re-use. Also, it is sometimes necessary to pre-treat the effluent or aqueous solution prior to carrying out the electrochemical reaction within the suitable reactor. Some of these procedures are discussed in the following examples. Other processes for recovering the cyanide formed or pre-treating the aqueous solution will be readily apparent to those skilled in the art; but will still be within the scope of the claims.

EXAMPLE 1

Cyanide can be recovered by expurgation as hydrocyanic acid. As stated above, the condition of low pH while not influencing the rate of thiocyanate oxidation promotes the protonation of cyanide ion, which in turn inhibits its further oxidation. By allowing the pH of the processing solution to decrease as acid is generated, the hydrocyanic acid may be continuously recovered by expurgation.

EXAMPLE 2

A portion of the thiocyanate containing cyanidation leach solution is continuously fed to a suitable electrochemical reactor where partial electrooxidation takes place forming cyanide as an intermediate product. This leach solution with its enriched cyanide concentration is returned to the cyanidation circuit. With appropriate process control, a steady state thiocyanate/cyanide concentration is maintained in the leach circuit.

EXAMPLE 3

Cyanide can be recovered using a strong base ion exchanger on a batch or semi-continuous basis.

EXAMPLE 4

Cyanide can be recovered by utilizing the electrochemical reactor in conjunction with an air stripper to recover the cyanide as hydrocyanic acid. The electrochemical reaction products are fed into an air stripper where air, hydrocyanic acid, water and hydrogen are separated from the electrochemical reaction products. The cyanide can then be recovered from the hydrocyanic acid by neutralization with lime water or sodium hydroxide in an adsorption tower.

EXAMPLE 5

Cyanide can be recovered by utilizing the electrochemical reactor in conjunction with a steam stripper to recover the cyanide as hydrocyanic acid. This is similar to the use of the air stripper except that steam and air are used with steam stripping. Once the hydrocyanic acid is recovered, it can be neutralized with lime or sodium hydroxide to recover the cyanide.

EXAMPLE 6

Cyanide can be recovered by directly recycling it in solution to a cyanide leaching process. Since the conversion of thiocyanate to cyanide results in virtually all sulphur species being converted to sulfate, the acceptability of sulfate must be considered. In the leaching of zinc sulfide containing residues, the acidic zinc-thiocyanate solution is treated electrochemically to convert most of the thiocyanate to cyanide and sulfate and simultaneously to recover a large portion of the zinc cathodically. The electrochemically converted acidic solution is then treated with lime to neutralize the sulphuric acid and the hydrocyanic acid. The solid calcium sulphate is thickened by settling and the clear supernatant $Ca(CN)_4^{2-}$ solution is used for make up further cyanidation and the zinc collected in the reactor is leached out with sulphuric acid.

EXAMPLE 7

Where the effluent contains an acidic solution of zinc and thiocyanate, a cation exchanger could be used operating on the acid cycle to remove the zinc from the solution. The essentially zinc free solution is then treated electrochemically to convert most of the thiocyanate to cyanide and sulphate and to cathodically deposit any residual zinc.

The elctrochemically converted acidic solution is then treated with lime to neutralize the sulphuric acid and hydrocyanic acid formed. The solid calcium sulphate is thickened by settling and the clear supernatant $Ca(CN)_4^{2-}$ solution is used for make up for further cyanidation.

Any cathodic zinc that has been deposited is removed from the reactor by sulphuric acid. Zinc is eluted from the cation exchanger with sulphuric acid.

EXAMPLE 8

An acidic zinc-thiocyanate solution is treated electrochemically to convert most of the thiocyanate to cyanide and sulphate and simultaneously recover a good portion of the zinc cathodically.

The electrochemically treated solution is then rendered essentially zinc free by using a cation exchanger operating on an acid cycle.

The solution is then treated with lime to neutralize the sulphuric acid and hydrocyanic acid. The solid calcium sulphate is thickened by settling and the clear supernatant $Ca(CN)_4^{2-}$ solution is used for make up for further cyanidation.

The zinc collected in the reactor is leached out with sulphuric acid and zinc is eluted from the cation exchanger with sulphuric acid.

EXAMPLE 9

Prior to carrying out the electrochemical reaction, where the cyanidation waste is basic, it is acidified to a pH ranging from 5 to 6.5 and any solids are filtered out.

The waste is then treated on a weak base anion exchanger to extract the highly selected metal cyanide species (eg. copper, nickel, iron and/or cobalt) and the thiocyanate is collected on a second weak base anion exchanger. The weak base anion exchanger containing essentially thiocyanate is then eluted with base such as sodium hydroxide or lime water to produce an effluent with a low buffer index.

The electrochemical reaction can then be carried out together with air stripping or steam stripping as set out in Examples 1 and 2.

This would be necessary only where the alkaline cyanidation waste has a high buffer index.

EXAMPLE 10

Where the effluent or aqueous solution contains a high buffer index based on the bi-carbonate/carbonate concentration, the buffer capacity can be substantially reduced by adding calcium chloride to precipitate the carbonate as calcium carbonate.

The electrochemical reaction to convert the thiocyanate to cyanide can then be carried out on the resulting solution.

EXAMPLE 11

Where the effluent or aqueous solution has a high buffering index because of the bi-carbonate/carbonate concentration, the buffering index can be substantially reduced by adding acid to substantially convert all of the bi-carbonate and carbonate to carbon dioxide and then expurgating the carbon dioxide to produce a solution with a low buffer index.

The electrochemical reaction of the present invention can then be carried out on the resulting solution to convert the thiocyanate to cyanide and the cyanide so formed can be recovered.

What we claim as our invention is:

1. A process for electrochemically oxidizing thiocyanate, said process comprising introducing an aqueous solution containing thiocyanate ions into a suitable electrochemical reactor, applying a direct current electrical potential to said reactor to convert the thiocyanate ions to relatively harmless reaction products while maintaining the pH of the solution in a range from 10 to 12.

2. A process as claimed in claim 1 wherein the reaction products are cyanate, ammonia, carbon dioxide and nitrogen.

3. A process as claimed in claim 1 wherein the pH is maintained by utilizing the buffer capacity of the aqueous solution.

4. A process as claimed in claim 1 wherein the buffer capacity of the solution is enhanced by adding carbonate.

* * * * *